(12) United States Patent
Gorin et al.

(10) Patent No.: US 11,000,972 B2
(45) Date of Patent: May 11, 2021

(54) PROCESS FOR FORMING A POWDER

(71) Applicants: Dow Global Technologies LLC, Midland, MI (US); Rohm and Haas Company, Collegeville, PA (US)

(72) Inventors: Craig F. Gorin, Midland, MI (US); Sanjib Biswas, Lake Jackson, TX (US); Manesh Nadupparambil Sekharan, Freeport, TX (US); Thomas L. Tomczak, Midland, MI (US); Robert S. Moglia, Midland, MI (US); Daniel L. Dermody, Midland, MI (US); Harpreet Singh, Lake Jackson, TX (US); Bryan L. McCulloch, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/475,838

(22) PCT Filed: Oct. 22, 2018

(86) PCT No.: PCT/US2018/056849
§ 371 (c)(1),
(2) Date: Jul. 3, 2019

(87) PCT Pub. No.: WO2019/083877
PCT Pub. Date: May 2, 2019

(65) Prior Publication Data
US 2020/0247010 A1    Aug. 6, 2020

Related U.S. Application Data

(60) Provisional application No. 62/576,863, filed on Oct. 25, 2017.

(51) Int. Cl.
| | | |
|---|---|---|
| *C08L 23/04* | (2006.01) | |
| *C08L 23/06* | (2006.01) | |
| *C08L 23/10* | (2006.01) | |
| *C08L 33/00* | (2006.01) | |
| *C08L 53/00* | (2006.01) | |

(Continued)

(52) U.S. Cl.
CPC ........ B29B 7/94 (2013.01); B01J 2/20 (2013.01); B29B 7/48 (2013.01); B29B 9/10 (2013.01);
(Continued)

(58) Field of Classification Search
CPC .......... C08L 23/04; C08L 23/06; C08L 23/08; C08L 23/10; C08L 23/12; C08L 23/14;
(Continued)

(56) References Cited

U.S. PATENT DOCUMENTS 3,746,681 A    7/1973  McClain
4,599,392 A    7/1986  McKinney et al.
(Continued)

FOREIGN PATENT DOCUMENTS

CN    104829762 A    8/2015
CN    105542377 A    5/2016

*Primary Examiner* — Vu A Nguyen
(74) *Attorney, Agent, or Firm* — Quarles & Brady LLP

(57) ABSTRACT

The present disclosure provides a process. The process includes (i) melt blending, in an extruder, (a) a polyolefin phase and (b) an aqueous phase in the presence of (c) at least one dispersant selected from an acrylic dispersant, a poloxamer dispersant, and combinations thereof; (ii) producing an interfacial tension from 0.1 dynes/cm to 25 dynes/cm; (iii) forming a polyolefin aqueous dispersion having from 25 wt % to 90 wt % solids content of dispersion; and (iv) removing the water from the polyolefin aqueous dispersion to form a powder. The powder has a mean volume average particle size from 10 μm to 300 μm, a sphericity from 0.92 to 1.0, a particle size distribution from 1 to less than 2, and a particle density from 98% to 100%.

9 Claims, 1 Drawing Sheet

(51) Int. Cl.
*C08L 71/02* (2006.01)
*B29B 7/94* (2006.01)
*B01J 2/20* (2006.01)
*B29B 7/48* (2006.01)
*B29B 9/10* (2006.01)
*C08J 3/05* (2006.01)
*C08J 3/16* (2006.01)
*C08J 3/205* (2006.01)
*C08L 23/12* (2006.01)

(52) U.S. Cl.
CPC . *C08J 3/05* (2013.01); *C08J 3/16* (2013.01); *C08J 3/2056* (2013.01); *C08L 23/06* (2013.01); *C08L 23/12* (2013.01); *C08L 53/00* (2013.01); *C08L 2205/025* (2013.01); *C08L 2205/035* (2013.01); *C08L 2207/062* (2013.01)

(58) Field of Classification Search
CPC .......... C08L 23/18; C08L 23/20; C08L 23/22; C08L 23/24; C08L 71/02; B29B 7/48; B29B 7/94; B29B 9/10; B01J 2/20; C08J 3/05; C08J 3/16; C08J 3/2056
See application file for complete search history.

(56) References Cited

U.S. PATENT DOCUMENTS

| | | |
|---|---|---|
| 4,988,781 A | 1/1991 | McKinney et al. |
| 5,539,021 A | 7/1996 | Pate et al. |
| 5,574,091 A | 11/1996 | Walther et al. |
| 5,677,383 A | 10/1997 | Chum et al. |
| 5,798,410 A | 8/1998 | Walther et al. |
| 5,938,437 A | 8/1999 | Devincenzo |
| 6,111,023 A | 6/2000 | Chum et al. |
| 6,984,695 B2 | 1/2006 | Brown et al. |
| 7,569,273 B2 | 8/2009 | Bredt et al. |
| 7,608,668 B2 | 10/2009 | Li Pi Shan et al. |
| 7,763,676 B2 | 7/2010 | Moncla et al. |
| 7,935,755 B2 | 5/2011 | Moncla et al. |
| 8,444,886 B2 | 5/2013 | Herve |
| 9,132,588 B2 * | 9/2015 | Lucas .................. B29C 64/153 |
| 2016/0044536 A1 | 2/2016 | Zeng et al. |
| 2016/0160016 A1 * | 6/2016 | Lundgard ............... C08L 23/06 524/522 |
| 2016/0177075 A1 | 6/2016 | Crimmins et al. |
| 2017/0183506 A1 | 6/2017 | Romick et al. |

* cited by examiner

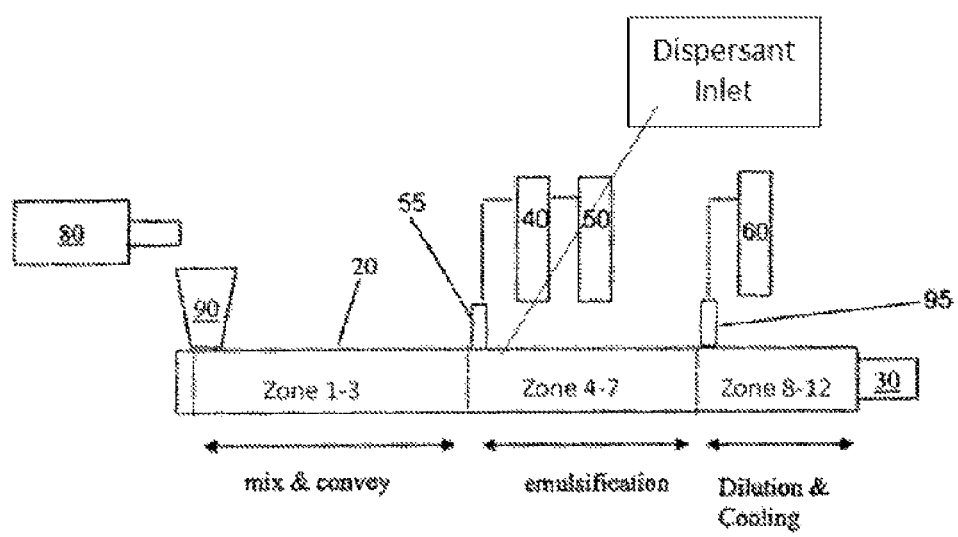

PROCESS FOR FORMING A POWDER

BACKGROUND

The present disclosure relates to a process for forming a powder.

Polyolefin powders having a small mean volume average particle size are useful in 3D-printing techniques such as powder bed fusion, where successive layers of powder are laid down and sintered to form a 3-dimensional end product. Powder bed fusion requires flowable powders to enable easy transport of the powders. Powder bed fusion also requires powder having a small mean volume average particle size. A polyolefin powder having a small mean volume average particle size is conventionally formed in one of three ways: (i) spray drying an aqueous polyolefin dispersion with small particle size to remove water and obtain aggregated dry powder; (ii) coagulating or aggregating a small particle size aqueous polyolefin dispersion and filtering the aggregate to remove water; or (iii) mechanically grinding the polyolefin to the desired size, such as through cryogrinding. When produced via spray drying and/or the coagulating or aggregating process, the resulting powder contains agglomerates with voids that are not fully dense, which deteriorates the mechanical properties of an end product formed from said powder. When produced via mechanical grinding, the resulting powder has a broad particle size distribution and the particles have irregular shapes (compared to spherical shapes).

The art recognizes the need for a process for producing a powder that has a small mean volume average particle size, has a narrow particle size dispersity, is fully dense, and is spherical.

SUMMARY

The present disclosure provides a process. The process includes (i) melt blending, in an extruder, (a) a polyolefin phase and (b) an aqueous phase in the presence of (c) at least one dispersant selected from an acrylic dispersant, a poloxamer dispersant, and combinations thereof; (ii) producing an interfacial tension from 0.1 dynes/cm to 25 dynes/cm; (iii) forming a polyolefin aqueous dispersion having from 25 wt % to 90 wt % solids content of dispersion; and (iv) removing the water from the polyolefin aqueous dispersion to form a powder. The powder has a mean volume average particle size from 10 μm to 300 μm, a sphericity from 0.92 to 1.0, a particle size distribution from 1 to less than 2, and a particle density from 98% to 100%.

The present disclosure provides a second process. The process includes (i) melt blending, in an extruder, (a) a polyolefin phase and (b) an aqueous phase in the presence of (c) at least one dispersant selected from an acrylic dispersant, a poloxamer dispersant, and combinations thereof; (ii) producing an interfacial tension from 0.1 dynes/cm to 25 dynes/cm; (iii) forming a polyolefin aqueous dispersion having from 5 wt % to 90 wt % solids content of dispersion; and (iv) removing the water from the polyolefin aqueous dispersion to form a powder. The powder has a mean volume average particle size from 10 μm to 300 μm, a sphericity from 0.92 to 1.0, a particle size distribution from 1 to less than 2, and a particle density from 98% to 100%.

The present disclosure also provides a powder. The powder contains (a) a polyolefin having a melting temperature from greater than 115° C. to 170° C., a density from 0.800 g/cc to 1.00 g/cc, and a melt index from 1.0 g/10 min to 1,000 g/10 min; and (b) from 1 wt % to 15 wt % of a dispersant selected from the group consisting of an acrylic dispersant, a poloxamer, and combinations thereof; and (c) optionally, a polyolefin wax. The powder has (i) a mean volume average particle size from 10 μm to 300 μm, (ii) a sphericity from 0.92 to 1.0, (iii) a particle size distribution from 1 to less than 2, and (iv) a particle density from 98% to 100%.

The present disclosure provides a second powder. The powder contains (a) a polyolefin having a melting temperature from greater than 115° C. to 170° C., a density from 0.800 g/cc to 1.00 g/cc, and a melt index from 1.0 g/10 min to 1,000 g/10 min; and (b) from 0.1 wt % to 15 wt % of a dispersant selected from the group consisting of an acrylic dispersant, a poloxamer, and combinations thereof; and (c) optionally, a polyolefin wax. The powder has (i) a mean volume average particle size from 10 μm to 300 μm, (ii) a sphericity from 0.92 to 1.0, (iii) a particle size distribution from 1 to less than 2, and (iv) a particle density from 98% to 100%.

BRIEF DESCRIPTION OF THE DRAWINGS

FIG. 1 is a schematic representation of an extruder in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" refers to an organic radical derived from an aliphatic hydrocarbon by deleting one hydrogen atom therefrom. An alkyl group may be a linear, branched, cyclic or a combination thereof. Nonlimiting examples of suitable alkyls include methyl, ethyl, n-propyl, i-propyl, n-butyl, t-butyl, i-butyl (or 2-methylpropyl), etc. In an embodiment, the alkyl has from 1 to 20, or from 1 to 12, or from 1 to 8 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "agglomerate" is a plurality of individual fine solid particles clumped or otherwise together forming a single mass.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE Arm advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Acid value (or acid number) is measured in accordance with ASTM D 1386/7. Acid value is a measure of the amount of carboxylic acid present in the final composition. The acid value is the number of milligrams of potassium hydroxide required for the neutralization of free carboxylic acids present in one gram of a substance (e.g., the ethylene-based polymer or dispersant). Units for acid value are mg KOH/g.

D10, D50, and D90 particle size is measured using a Coulter LS 230 Laser Light Scattering Particle Sizer, available from Coulter Corporation. D10 particle size is the particle diameter at which 10% of the powder's mass is composed of particles with a diameter less than this value. D50 particle size is the particle diameter at which 50% of the powder's mass is composed of particles with a diameter less than this value and 50% of the power's mass is composed of particles with a diameter greater than said value. D90 particle size is the particle diameter at which 90% of the powder's mass is composed of particles with a diameter less than this value.

Density is measured in accordance with ASTM D792, Method B. The result is recorded in grams per cubic centimeter (g/cc).

Drop point is measured in accordance with ASTM D3954.

Flow rate through a funnel indicates the flow of the powder and is measured as a function of the time it takes for 50 g powder to flow through a funnel. A large funnel and a small funnel are used. The "large funnel" is a Fisherbrand™ 10-500-2 funnel having a 225 ml capacity, a stem with an inner diameter of 18 mm, and a height of 39.2 mm. The "small funnel" is a Fisherbrand™ 10-500-7 funnel having a 175 ml capacity, a stem with an inner diameter of 3.1 mm, and a height of 36.3 mm.

Interfacial tension is measured using a drop tensiometer on a composition containing 5 wt % dispersant in an aqueous phase that is water against Lucant™ LX001 (a hydrocarbon-based synthetic oil), available from Mitusi Chemicals Inc. Interfacial tension is measured at 60° C.

Mean volume average particle size is measured using a Coulter LS 230 Laser Light Scattering Particle Sizer, available from Coulter Corporation.

Melt index (MI) (I2) in g/10 min is measured using ASTM D1238 (190° C./2.16 kg).

Melt flow rate (MFR) in g/10 min is measured using ASTM D1238 (230° C./2.16 kg).

Melt viscosity is measured using a Brookfield Viscometer Model, and a Brookfield RV-DV-II-Pro viscometer spindle 31, at 135° C. for the ethylene-based wax and at 170° C. for the propylene-based wax. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature until the melted sample is one inch below the top of the sample chamber. The viscometer apparatus is lowered, and the spindle submerged into the sample chamber. Lowering was continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Particle size distribution is calculated in accordance with Equation A:

$$\text{Particle size distribution} = \frac{(D90 - D10)}{D50}. \qquad \text{Equation A}$$

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turied., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turied., 2d ed. 1997). Baselines are drawn from below and above the glass transition region and extrapolated through the Tg region. The temperature at which the sample heat capacity is half-way between these baselines is the Tg.

Particle Density

A LUMiSizer multi-sample analytical centrifuge is used to screen emulsion stability. Each sample is spun through an array of IR lasers and detectors which translate the transmission values into a 2-dimension profile. The progression of the transmission profiles relates to the terminal velocity V, of a dispersed droplet as defined by Stokes law, Equation C:

$$V = \frac{2r_d^2 g(\rho_d - \rho_f)}{9\eta},\quad \text{Equation C}$$

where $r_d$ is the droplet radius, g is acceleration of the droplet, $\rho_d$ is droplet density, $\rho_f$ fluid medium density, and $\eta$ is the dynamic viscosity of the fluid. Equation D defines the relative acceleration factor of the LUMiSizer, where r is the position of the sample in mm and rpm is the rotor speed in revolutions per minute. This acceleration of gravity is multiplied by this factor and substituted into Equation C.

$$g = \text{Acceleration Factor} = 1.18 * r * \left(\frac{rpm}{1000}\right)^2 \quad \text{Equation D}$$

With a known particle diameter, Equation C can determine the particle density of polymeric particles. For example, when a LUMiSizer determines a particle velocity of 12.7 μm/sand an acceleration force of 2.45E9 μm/s$^2$, literature values for the density and viscosity of water at 20° C. are used (1E-12 g/μm$^3$ and 1E-6 g/μm-s, respectively), and multiple light scattering determines an average particle size of 37 μm, plugging these values into Equation C and solving for density yields a density of 0.96 g/cm$^3$. With the expected density of these particles being 0.975 g/cm$^3$, this indicates there are very few to no voids, with the particle being 98.4% of the expected density.

Sphericity

Scanning electron microscopy images are taken to characterize the particles. Images of smooth spheroids exhibit no visible voids up to 10,000× magnification. "Sphericity" ($\psi$) of a particle is the ratio of the surface area of a sphere (with the same volume as the given particle) to the surface area of the particle. For a spheroid, sphericity ($\psi$) is calculated in accordance with Equation B, where V is volume and A is surface area, and is obtained by measuring the length of the axes of the 2D projection of the spherical particle, approximating it as a spheroid, and solving the equation where a and b are the semi-major and semi-minor axes of the spheroid respectively.

$$\Psi = \frac{\pi^{\frac{1}{2}}(6V_p)^{\frac{2}{3}}}{A_p} = \frac{2\sqrt[3]{ab^2}}{a + \frac{b^2}{\sqrt{a^2 - b^2}} \ln\left(\frac{n + \sqrt{a^2 - b^2}}{b}\right)}. \quad \text{Equation B}$$

DETAILED DESCRIPTION

The present disclosure relates to a process. The process includes (i) melt blending, in an extruder, (a) a polyolefin phase and (b) an aqueous phase in the presence of (c) at least one dispersant selected from an acrylic dispersant, a poloxamer dispersant, and combinations thereof; (ii) producing an interfacial tension from 0.1 dynes/cm to 25 dynes/cm; (iii) forming a polyolefin aqueous dispersion having from 25 wt % to 90 wt % solids content of dispersion; and (iv) removing the water from the polyolefin aqueous dispersion to form a powder. The powder has a mean volume average particle size from 10 μm to 300 μm, a sphericity from 0.92 to 1.0, a particle size distribution from 1 to less than 2, and a particle density from 98% to 100%.

i. Melt Blending in an Extruder

The process includes the step of melt blending, in an extruder, (a) a polyolefin phase and (b) an aqueous phase in the presence of (c) at least one dispersant selected from an acrylic dispersant, a poloxamer dispersant, and combinations thereof. In an embodiment, the melt blending further includes (d) an optional polyolefin wax and/or (e) an optional additive.

a. Polyolefin Phase

The process includes melt blending (a) a polyolefin phase.

The polyolefin phase contains a polyolefin. Nonlimiting examples of suitable polyolefins include ethylene-based polymer, propylene-based polymer, and combinations thereof.

In an embodiment, the polyolefin phase, and further the polyolefin, has a melt index from 0.1 g/10 min, or 1.0 g/10 min, or 2.0 g/10 min, or 4.0 g/10 min to 9.0 g/10 min, or 10.0 g/10 min, or 35 g/10 min, or 40 g/10 min, or 50 g/10 min, or 100 g/10 min, or 500 g/10 min, or 1,000 g/10 min.

In an embodiment, the polyolefin phase, and further the polyolefin, has a melting temperature from 95° C., 96° C., or 115° C., or 120° C., or 122° C. to 148° C., 150° C., or 155° C., or 160° C., or 165° C., or 170° C. In another embodiment, the polyolefin phase, and further the polyolefin, has a melting temperature from greater than 115° C. to 170° C., or from 120° C. to 150° C., or from 122° C. to 148° C.

In an embodiment, the polyolefin phase, and further the polyolefin, has a density from 0.800 g/cc, or 0.850 g/cc, or 0.870 g/cc, or 0.875 g/cc, or 0.877 g/cc to 0.900 g/cc, or 0.955 g/cc, or 0.965 g/cc, or 0.970 g/cc, or 0.975 g/cc, or 0.980 g/cc, or 0.990 g/cc, or 0.995 g/cc, or 1.00 g/cc.

1. Ethylene-Based Polymer

In an embodiment, the polyolefin phase contains an ethylene-based polymer. Nonlimiting examples of suitable ethylene-based polymer include LDPE; LLDPE; ULDPE; VLDPE; EPE; ethylene/α-olefin multi-block copolymers; substantially linear, or linear, plastomers/elastomers; HDPE; and combinations thereof.

The term "ethylene/α-olefin multi-block copolymer" refers to an ethylene/C4-C8 α-olefin multi-block copolymer consisting of ethylene and one copolymerizable C4-C8 α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The C4-C8 α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where η is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$,
where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 120° C., or 122° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% min$^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

In an embodiment, the polyolefin phase contains an ethylene-based polymer. In a further embodiment, the ethylene-based polymer is selected from HDPE, LDPE, and ethylene/α-olefin multi-block copolymer. The ethylene-based polymer has one, some, or all of the following properties: (i) a melt index from 0.1 g/10 min, or 1.0 g/10 min, or 2.0 g/10 min, or 4.0 g/10 min to 9.0 g/10 min, or 10.0 g/10 min, or 15 g/10 min; and/or (ii) a melting temperature from 95° C., 96° C., or 115° C., or 118° C., or 120° C., or 122° C. to 133° C., or 135° C., or 140° C.; and/or (iii) a density from 0.860 g/cc, or 0.870 g/cc, or 0.875 g/cc, or 0.877 g/cc to 0.900 g/cc, or 0.955 g/cc, or 0.965 g/cc, or 0.970 g/cc, or 0.975 g/cc.

In an embodiment, the polyolefin phase contains a blend of LDPE and HDPE. In a further embodiment, the polyolefin phase contains a blend of LDPE and HDPE having a weight ratio of 1:1.

The ethylene-based polymer may comprise two or more embodiments discussed herein.

2. Propylene-Based Polymer

In an embodiment, the polyolefin phase contains a propylene-based polymer. Nonlimiting examples of suitable propylene-based polymer include propylene copolymer, propylene homopolymer, and combinations thereof.

In an embodiment, the propylene-based polymer is a propylene homopolymer. The propylene homopolymer contains 100 wt % units derived from propylene, based on the total weight of the propylene homopolymer. In an embodiment, the propylene homopolymer is DOW™ 6D43, available from The Dow Chemical Company.

In an embodiment, the propylene-based polymer is a propylene/α-olefin copolymer. Nonlimiting examples of suitable α-olefins include $C_2$ and $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene. In an embodiment, the propylene-based polymer does not contain an aromatic comonomer polymerized therein. In an embodiment, the propylene/α-olefin copolymer is a propylene/ethylene copolymer containing greater than 50 wt % units derived from propylene, or from 51 wt %, or 55 wt %, or 60 wt % to 70 wt %, or 80 wt %, or 90 wt %, or 95 wt %, or 99 wt % units derived from propylene, based on the weight of the propylene/ethylene copolymer. The propylene/ethylene copolymer contains a reciprocal amount of units derived from ethylene, or from less than 50 wt %, or 49 wt %, or 45 wt %, or 40 wt % to 30 wt %, or 20 wt %, or 10 wt %, or 5 wt %, or 1 wt %, or 0 wt % units derived from ethylene, based on the weight of the propylene/ethylene copolymer.

In an embodiment, the polyolefin phase contains a propylene-based polymer. In a further embodiment, the propylene-based polymer is a propylene homopolymer. The propylene-based polymer has one, some, or all of the following properties: (i) a melt flow rate from 10.0 g/10 min, or 20 g/10 min, or 30 g/10 min to 35 g/10 min, or 40 g/10 min, or 45 g/10 min, or 50 g/10 min; and/or (ii) a melting temperature from 135° C., 140° C., or 145° C., or 148° C. to 150° C., or 155° C., or 160° C., or 165° C., or 170° C.; and/or (iii) a density from 0.880 g/cc, or 0.885 g/cc, or 0.890 g/cc to 0.900 g/cc, 0.905 g/cc, or 0.910 g/cc.

The propylene-based polymer may comprise two or more embodiments discussed herein.

In an embodiment, the polymer phase includes a polyolefin selected from propylene homopolymer, HDPE, LDPE, ethylene/α-olefin multi-block copolymer, and combinations thereof.

In an embodiment, the polyolefin phase contains, consists essentially of, or consists of, at least one polyolefin having a melting temperature greater than 115° C., or from 116° C. to 170° C.

The polyolefin phase may comprise two or more embodiments discussed herein.

b. Aqueous Phase

The process includes melt blending (b) an aqueous phase. The aqueous phase includes water. A nonlimiting example of a suitable water is deionized (DI) water.

In an embodiment, the process includes maintaining, during the melt blending, a polyolefin phase to aqueous phase viscosity ratio from 1:1, or 2:1 to 4:1, or 5:1, or 10:1, or 15:1, or 20:1.

The polyolefin phase may comprise two or more embodiments discussed herein.

c. Dispersant

The process includes melt blending (a) the polyolefin phase and (b) the aqueous phase in the presence of (c) a dispersant. The dispersant is selected from an acrylic dispersant, a poloxamer dispersant, and combinations thereof.

1. Acrylic Dispersant

In an embodiment, the dispersant is an acrylic dispersant. An "acrylic dispersant" is an acrylic-monomer containing material that promotes the formation and stabilization of a dispersion. Nonlimiting examples of suitable acrylic monomer include alkyl (meth)acrylates, ethyl hexylacrylate (2-EHA), and combinations thereof. Nonlimiting examples of suitable acrylic monomer include nonionic copolymerized monoethylenically unsaturated monomers such as (meth)acrylic ester monomer including methyl (meth)acrylate (MMA), ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acrylamides, acetamides or cyanoacetates of (meth)acrylic acid; styrene or substituted styrenes; vinyl toluene; monoethylenically unsaturated acetophenone or benzophenone derivatives; vinyl acetate or other vinyl esters; vinyl monomers such as vinyl chloride, vinylidene chloride, N-vinyl pyrollidone; and (meth)acrylonitrile. The term "(meth)" followed by another term such as (meth)acrylate refers to both acrylates and methacrylates.

In an embodiment, the acrylic dispersant contains at least one acrylic monomer and a carboxylic acid comonomer. Nonlimiting examples of suitable carboxylic acid comonomers include acrylic acid, methacrylic acid (MAA), crotonic acid, itaconic acid, fumaric acid, maleic acid, monomethyl itaconate, monomethyl fumarate, monobutyl fumarate, and maleic anhydride. In an embodiment, the acrylic dispersant is an alkyl (meth)acrylate/carboxylic acid interpolymer. In a further embodiment, the acrylic dispersant is a 2-EHA/alkyl (meth)acrylate/carboxylic acid terpolymer.

In an embodiment, the acrylic dispersant is ethylene-free.

In an embodiment, the acrylic dispersant is an ethylhexyl acrylate/methylmethacrylate (MMA)/methacrylic acid terpolymer (or a 2-ethylhexyl acrylate/MMA/methacrylic acid terpolymer). In a further embodiment, the ethylhexyl acrylate/MMA/methacrylic acid terpolymer contains from 5 wt %, or 10 wt % to 74 wt %, or 75 wt %, or 80 wt % units derived from 2-EHA; from 1 wt %, or 2 wt % to 66 wt %, or 70 wt % units derived from MMA; and from 15 wt %, or 19 wt % to 24 wt %, or 25 wt % units derived from MAA. In an embodiment, the ethylhexyl acrylate/MMA/methacrylic acid terpolymer has one, some, or all of the following properties: (i) a glass transition temperature, Tg, from −60° C., or −50° C., or −40° C., or −30° C., or −20° C., or −10° C., or 0° C., to 5° C., or 10° C., or 50° C., or 90° C., or 100° C.; and/or (ii) a viscosity from 70 mPa·s, or 80 mPa·s to 90 mPa·s, or 100 mPa·s, or 150 mPa·s, or 190 mPa·s, or 200 mPa·s; and/or (iii) an acid value from 100 mg KOH/g, or 110 mg KOH/g, or 140 mg KOH/g, or 150 mg KOH/g to 155 mg KOH/g, or 160 mg KOH/g, or 170 mg KOH/g; and/or (iv) a pH from 4.0, or 4.4 to 4.5, or 5.0, or 6.0, or 7.0.

In an embodiment, the acrylic dispersant is a liquid at room temperature (23° C.).

In an embodiment, the acrylic dispersant is a solid at room temperature (23° C.). The solid acrylic dispersant is in a dried form when it is provided into the dispersion.

The acrylic dispersant may comprise two or more embodiments discussed herein.

2. Poloxamer Dispersant

In an embodiment, the dispersant is a poloxamer dispersant. A "poloxamer dispersant" is a block copolymer of ethylene oxide and propylene oxide that promotes the formation and stabilization of a dispersion.

Nonlimiting examples of suitable poloxamer dispersant include the nonionic surface active agents marketed by Wyandotte Chemicals prepared (see the Pluronic Grid Approach, vol. II, Wyandotte Chemicals Corp., 1957) by polymerizing ethylene oxide on the ends of a preformed polymeric base of polyoxypropylene. Both the length or molecular weight of the polyoxypropylene base and the polyoxyethylene end segments can be varied to yield a wide variety of products. For example, a nonlimiting example of a suitable poloxamer dispersant is Pluronic=F-98, wherein a polyoxypropylene with a weight average molecular weight (Mw) of 2,700 is polymerized with ethylene oxide to give a product having a Mw about 13,500 g/mol. This product may be described as containing 20 wt % of propylene oxide and 80 wt % of ethylene oxide, based on the total weight of the poloxamer dispersant. An example of another suitable Pluronic is F-108 (Mw=14,600 g/mol, 20 wt % propylene oxide, 80 wt % ethylene oxide). In an embodiment, the poloxamer dispersant contains at least 50 wt % ethylene oxide, or from 50 wt % to 80 wt % ethylene oxide; and a reciprocal amount, or from 20 wt % to 50 wt % propylene oxide, based on the total weight of the poloxamer dispersant.

In an embodiment, the poloxamer dispersant has a melting point, Tm, from 40° C., or 50° C., or 55° C., or 57° C. to 60° C., or 65° C., or 70° C., or 80° C., or 90° C., or 100° C.

The poloxamer dispersant may comprise two or more embodiments discussed herein.

d. Optional Polyolefin Wax

In an embodiment, the process includes melt blending (a) the polyolefin phase, (b) the aqueous phase, and (d) an optional polyolefin wax in the presence of (c) the dispersant. The polyolefin wax may be an ethylene-based wax or a propylene-based wax.

1. Ethylene-Based Wax

In an embodiment, the polyolefin wax utilized in the melt blending step is an ethylene-based wax. An "ethylene-based wax" is an ethylene-based polymer having a melt viscosity, at 140° C., that is less than, or equal to (≤) 1,000 mPa·s, or ≤500 mPa·s. The ethylene-based wax is composed of a majority amount (i.e., greater than 50 wt %) of polymerized ethylene monomer and optional α-olefin comonomer.

In an embodiment, the ethylene-based wax is selected from a high density, low molecular weight polyethylene wax, a by-product polyethylene wax, a Fischer-Tropsch wax containing an ethylene-based polymer, oxidized Fischer-Tropsch waxes containing an ethylene-based polymer, functionalized polyethylene waxes, and combinations thereof.

In an embodiment, the ethylene-based wax has one, some, or all of the following properties: (i) a density from 0.900 g/cc, or 0.910 g/cc, or 0.920 g/cc, or 0.930 g/cc to 0.940 g/cc, or 0.950 g/cc, or 0.960 g/cc, or 0.970 g/cc, or 0.980 g/cc, or 0.990 g/cc, or 0.995 g/cc; and/or (ii) a melt viscosity, at 140° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s, or 200 mPa·s, or 300 mPa·s, or 400 mPa·s, or 500 mPa·s; and/or (iii) an acid value from 0 mg KOH/g, or 10 mg KOH/g, or 20 mg KOH/g, or 30 mg KOH/g, or 40 mg KOH/g to 45 mg KOH/g, or 50 mg KOH/g; and/or (iv) a drop point from 100° C., or 110° C., or 115° C., or 120° C. to 123° C., or 125° C., or 130° C., or 140° C.

The ethylene-based wax may comprise two or more embodiments discussed herein.

2. Propylene-Based Wax

In an embodiment, the polyolefin wax utilized in the melt blending step is a propylene-based wax. A "propylene-based wax" is a propylene-based polymer having a melt viscosity, at 170° C., that is less than, or equal to (≤) 1,500 mPa·s, or 1,400 mPa·s, or ≤1,000 mPa·s. The propylene-based wax is composed of a majority amount (i.e., greater than 50 wt %) of polymerized propylene monomer and optional α-olefin comonomer. In an embodiment, the propylene-based wax is a propylene homopolymer. The propylene-based wax may be produced by way of Ziegler-Natta catalyst polymerization or metallocene catalyst polymerization yielding a Ziegler-Natta catalyzed propylene-based wax or a metallocene-catalyzed propylene-based wax, respectively. Nonlimiting examples of suitable propylene-based waxes include those sold under the tradename LICOCENE, available from Clariant.

In an embodiment, the propylene-based wax has one, some, or all of the following properties: (i) a density from 0.89 g/cc, or 0.90 g/cc to 0.91 g/cc, or 0.93 g/cc, or 0.95 g/cc; and/or (ii) a melt viscosity, at 170° C., from 40 mPa·s, or 50 mPa·s, or 60 mPa·s to 70 mPa·s, or 80 mPa·s, or 90 mPa·s, or 100 mPa·s, or 500 mPa·s, or 1,000 mPa·s, or 1,400 mPa·s, or 1,500 mPa·s; and/or (iii) an acid value from 0 mg KOH/g, or 10 mg KOH/g, or 20 mg KOH/g, or 30 mg KOH/g, or 40 mg KOH/g to 41 mg KOH/g, or 45 mg KOH/g, or 50 mg KOH/g; and/or (iv) a drop point from 120° C., or 130° C., or 140° C. to 144° C., or 145° C., or 150° C., or 155° C.

The propylene-based wax may comprise two or more embodiments discussed herein.

In an embodiment, the polyolefin wax is functionalized, such as a functionalized ethylene-based wax or a functionalized propylene-based wax. A nonlimiting example of a suitable functionalized polyolefin wax is a carboxylic-functionalized polyolefin wax. A "carboxylic-functionalized polyolefin wax" is a polyolefin wax with a carboxylic acid-based moiety bonded to the polyolefin chain (for example, a carboxylic acid-based moiety grafted to the polyolefin chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the polyolefin include maleic acid, fumaric acid, itaconic acid, acrylic acid, methacrylic acid, crotonic acid, maleic anhydride, and itaconic anhydride. In an embodiment, the carboxylic-functionalized polyolefin wax is a maleic-anhydride-functionalized polyolefin wax.

In an embodiment, the carboxylic-functionalized propylene-based wax is a maleic-anhydride-grafted propylene-based wax. A nonlimiting example of a suitable maleic-anhydride-grafted propylene-based wax is Licocene™ PP MA 6452, available from Clariant.

In an embodiment, the carboxylic-functionalized ethylene-based wax is a maleic-anhydride-grafted ethylene-based wax. A nonlimiting example of a suitable maleic-anhydride-grafted ethylene-based wax is Licocene™ PE MA 4351, available from Clariant.

The polyolefin wax may comprise two or more embodiments discussed herein.

e. Optional Additive

In an embodiment, the process includes melt blending (a) the polyolefin phase, (b) the aqueous phase, (d) the optional polyolefin wax, and (e) an optional additive in the presence of (c) the dispersant.

A nonlimiting example of a suitable additive is a base. The base neutralizes the dispersant to reduce the acid value of the dispersant by from 100% to 140%. Nonlimiting examples of suitable bases include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide (KOH), calcium hydroxide, strontium hydroxide, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; dimethylethanolamine (DMEA); or ammonium hydroxide. In an embodiment, the base is selected from KOH, DMEA, and combinations thereof.

The additive may comprise two or more embodiments discussed herein.

In an embodiment, the process includes the step of melt blending, in an extruder, (a) a polyolefin phase, (b) an aqueous phase, (d) an optional polyolefin wax, and (e) an optional additive in the presence of (c) at least one dispersant selected from an acrylic dispersant, a poloxamer dispersant, and combinations thereof. Nonlimiting examples of suitable extruders include single-screw extruders and multi-screw extruders (such as twin-screw extruders). The step of melt blending utilizes a multi-screw extruder having two or more screws, to which a kneading block can be added at any position of the screws. The extruder may be equipped with a first material-supplying inlet and a second material-supplying inlet, and further third and fourth material-supplying inlets in this order from the upper stream to the downstream along the flow direction of material to be kneaded. Further, a vacuum vent may be included at an optional position of the extruder. In an embodiment, the polyolefin aqueous dispersion containing the (a) polyolefin phase, (b) the aqueous phase, (c) the dispersant, (d) the optional polyolefin wax, and (e) the optional additive is first diluted to contain from 1 wt % to 3 wt %, or 10 wt %, or 50 wt % of the aqueous phase, and is then subsequently diluted to contain from 50 wt %, or 40 wt % to 30 wt %, or 10 wt % of the aqueous phase, based on the total weight of the polyolefin aqueous dispersion.

FIG. 1 schematically illustrates a nonlimiting example of a suitable extrusion apparatus. An extruder 20, such as twin screw extruder, is coupled to a back pressure regulator, melt pump, or gear pump, and an outlet 30. In an embodiment, the apparatus further includes a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar may be used to provide the base and the initial water to the extruder 20. In another embodiment, a liquid injection pump provides a flow of 300 cc/min at 200 bar or 600 cc/min at 133 bar. In another embodiment, the base and the initial water are preheated in a preheater.

The (a) polyolefin phase, in the form of pellets, powder, or flakes, is fed from the feeder 80 to an inlet 90 of the extruder, where the polyolefin phase is melted or compounded at a temperature greater than the melting temperature of the polyolefin phase, such as from 100° C., or 110° C., or 120° C., or 130° C., or 140° C. to 150° C., or 160° C., or 170° C., or 180° C., or 190° C., or 200° C. In an embodiment, the (c) dispersant is added to the (a) polyolefin phase through an opening along with the (a) polyolefin phase. In another embodiment, the (c) dispersant is added separately to the twin screw extruder 20. The melted (a) polyolefin phase is then delivered from the mix and convey zone to an emulsification zone of the extruder where the initial amount of water (the (b) aqueous phase) and base from the reservoirs 40 and 50 is added through inlet 55. In an embodiment, the (c) dispersant may be added additionally or exclusively to the water stream. In an embodiment, the emulsified mixture is further diluted with additional water via inlet 95 from reservoir 60 in a dilution and cooling zone of the extruder 20. Typically, the dispersion is diluted to at least 30 wt % water in the cooling zone. The diluted mixture may be diluted any number of times until the desired dilution level is achieved.

A nonlimiting example of suitable melt blending in an extruder is the extruder-based mechanical dispersion process disclosed in U.S. Pat. No. 7,763,676, the entire contents of which are hereby incorporated by reference. The extruder-based mechanical dispersion process imparts high shear at a a shear rate from $10\ s^{-1}$ to $10{,}000\ s^{-1}$ on the (a) polyolefin phase/(b) aqueous phase mixture to facilitate a water continuous system with small polymer particles in the presence of (c) a dispersant that reduces the interfacial tension between the (a) polyolefin phase and (b) the aqueous phase. A high solids content polyolefin aqueous dispersion is formed in the emulsification zone of the extruder, also known as a high internal phase emulsion (HIPE) zone, which is then gradually diluted to the desired solids concentration, as the HIPE progresses from the emulsification zone to the first and second dilution zones.

In an embodiment, the melt blending in an extruder is performed using a continuous extruder-based mechanical dispersion process such as the BLUEWAVE™ process of The Dow Chemical Company.

In an embodiment, the melt blending includes feeding (a) the polyolefin phase into the extruder at a feed rate of from 25 g/min to 5,000 g/min, or from 25 g/min, or 30 g/min, or 34 g/min to 55 g/min, or 60 g/min, or 65 g/min, or 70 g/min, or 75 g/min; (d) the polyolefin wax into the extruder at a feed rate of from 5 g/min to 1,000 g/min, or from 5 g/min, or 6 g/min to 12 g/min, or 15 g/min; (c) the dispersant into the extruder at a feed rate of from 5 g/min to 3,000 g/min, or from 5 g/min, or 6 g/min to 15 g/min, or 16 g/min, or 20 g/min, or 25 g/min, or 30 g/min, or 32 g/min, or 35 g/min; and optionally, (e) the additive into the extruder at a feed rate of from 0.1 mL/min to 800 mL/min, or from 0.1 mL/min, or 0.4 mL/min to 3 mL/min, or 8 mL/min, or 10 mL/min.

In an embodiment, the polyolefin aqueous dispersion contains: (a) from 50 wt %, 60 wt %, or 70 wt % to 90 wt %, or 95 wt % of the polyolefin phase; (c) from 1 wt %, or 2 wt %, or 5 wt % to 15 wt %, or 20 wt %, or 40 wt % of the dispersant; (d) from 0 wt %, or 1 wt %, or 5 wt % to 15 wt %, or 20 wt % of the polyolefin wax; and (e) from 0 wt %, or 0.05 wt % to 2 wt %, or 5 wt % additive, based on the total weight of (a) the polyolefin phase, (c) the dispersant, (d) the polyolefin wax, and (e) the additive.

It is understood that the sum of the components in each of the polyolefin aqueous dispersions disclosed herein, including the foregoing polyolefin aqueous dispersion, yields 100 wt %.

The melt blending step may comprise two or more embodiments discussed herein.

ii. Producing an Interfacial Tension

The process includes the step of producing an interfacial tension from 0.1 dynes/cm to 25 dynes/cm. "Interfacial tension" is the force that holds together (a) the polyolefin phase and (b) aqueous phase. Not wishing to be bound by any particular theory, it is believed the presence of (c) a dispersant selected from an acrylic dispersant, a poloxamer dispersant, and combinations thereof reduces the interfacial tension between the (a) polyolefin phase and (b) the aqueous phase.

In an embodiment, the process includes the step of producing an interfacial tension from 0.1 dynes/cm, or 5.0 dynes/cm, or 6.0 dynes/cm, or 6.5 dynes/cm to 7.0 dynes/cm, or 10.0 dynes/cm, or 19.0 dynes/cm, or 20.0 dynes/cm, or 25 dynes/cm.

In an embodiment, the process includes (i) melt blending in the presence of (c) the dispersant that is the poloxamer; and (ii) producing an interfacial tension from 0.1 dynes/cm, or 1.0 dynes/cm, or 5.0 dynes/cm, or 10.0 dynes/cm to 12.6 dynes/cm; or 13.0 dynes/cm, or 15.0 dynes/cm, or 20.0 dynes/cm, or 25 dynes/cm.

In an embodiment, the process includes: (i) melt blending in the presence of (c) the dispersant that is the acrylic dispersant; and (ii) producing an interfacial tension from 0.1 dynes/cm, or 1.0 dynes/cm, or 6.0 dynes/cm, or 6.9 dynes/cm to 19.0 dynes/cm, or 20.0 dynes/cm, or 25 dynes/cm.

The producing an interfacial tension step may comprise two or more embodiments discussed herein.

iii. Forming a Polyolefin Aqueous Dispersion

The present process includes the step of forming a polyolefin aqueous dispersion having from 25 wt % to 90 wt % solids content of dispersion.

The polyolefin aqueous dispersion has from 25 wt % to 90 wt % solids content of dispersion. The "solids content" is the total combined weight of the (a) polyolefin phase, (c) dispersant, (d) optional polyolefin wax, and (e) optional additive, based on the total weight of the polyolefin aqueous dispersion including (b) the aqueous phase. In other words, the polyolefin aqueous dispersion with a solids content of 15 wt % to 90 wt % contains a reciprocal amount of (b) aqueous phase, or from 10 wt % to 85 wt % aqueous phase, based on the total weight of the polyolefin aqueous dispersion. In an embodiment, the polyolefin aqueous dispersion has a solids content from 25 wt %, or 30 wt %, or 40 wt %, or 50 wt % to 60 wt %, or 70 wt %, or 80 wt %, or 90 wt %.

In an embodiment, the polyolefin aqueous dispersion has from 5 wt % to 90 wt % solids content of dispersion. In another embodiment, the polyolefin aqueous dispersion has a solids content from 5 wt %, or 10 wt %, or 15 wt %, or 20 wt %, or 25 wt %, or 30 wt %, or 40 wt %, or 50 wt % to 60 wt %, or 70 wt %, or 80 wt %, or 90 wt %.

In an embodiment, during melt blending and in the emulsification zone of the extruder, the polyolefin aqueous dispersion has a solids content from 50 wt %, or 55 wt %, or 60 wt % to 70 wt %, or 75 wt %, or 80 wt %, or 85 wt %, or 90 wt %; and a reciprocal amount of (b) aqueous phase, or from 10 wt %, or 15 wt %, or 20 wt %, or 25 wt %, or 30 wt % to 40 wt %, or 45 wt %, or 50 wt % (b) aqueous phase, based on the total weight of the polyolefin aqueous dispersion.

In an embodiment, after exiting the dilution zone of the extruder, the polyolefin aqueous dispersion has a solids content from 5 wt %, or 15 wt %, or 30 wt %, or 35 wt %, or 40 wt % to 50 wt %, or 55 wt %, or 60 wt %; and a reciprocal amount of (b) aqueous phase, or from 40 wt %, or 45 wt %, or 50 wt % to 60 wt %, or 65 wt %, or 70 wt % (b) aqueous phase, based on the total weight of the polyolefin aqueous dispersion.

In an embodiment, the process includes: forming a polyolefin aqueous dispersion having from 60 wt %, or 70 wt % to 90 wt % solids content of dispersion; and adding diluting water to the polyolefin aqueous dispersion to form a diluted polyolefin aqueous dispersion having from 5 wt %, or 15 wt %, or 30 wt %, or 40 wt % to 50 wt %, or 60 wt % solids content of dispersion.

In an embodiment, the polyolefin aqueous dispersion is a stable dispersion. A "stable dispersion" is an emulsion in which solid particles are uniformly suspended in a continuous aqueous phase. A stable dispersion excludes materials exiting the extruder in the form of strings or as caked material that cannot be diluted in an aqueous phase.

The forming a polyolefin aqueous dispersion step may comprise two or more embodiments discussed herein.

iv. Removing the Water

The present process includes the step of removing the water from the polyolefin aqueous dispersion to form a powder, the powder having a mean volume average particle size from 10 µm to 300 µm, a sphericity from 0.92 to 1.0, a particle size distribution from 1 to less than 2, and a particle density from 98% to 100%.

In an embodiment, the step of removing the water from the polyolefin aqueous dispersion, or further the diluted polyolefin aqueous dispersion, includes mixing water into the dispersion and allowing the solid particles to float to the top of the mixture. Then, the solid particles are skimmed from the top of the mixture and filtered using vacuum filtration. The filtered particles may then be rinsed with water and dried through vacuum or air drying at room temperature (23° C.) to form a powder.

In an embodiment, a flow aid is mixed with the powder, such as using a speed mixer cup in a dual axis mixer. Nonlimiting examples of suitable flow aids include talc (such as ultra talc), silica-based flow aids (such as fumed silica, colloidal silica, silicon dioxide, and calcium silicate), clay (such as kaolin clay), diatomaceous earth, limestone, and combinations thereof. In an embodiment, the powder contains from 0.05 wt %, or 1.0 wt % to 1.5 wt %, or 2.0 wt % flow aid, based on the total weight of the powder.

The powder has a mean volume average particle size from 10 µm to 300 µm. In an embodiment, the powder has a mean volume average particle size from 10 µm, or 11 µm to 110 µm, or 150 µm, or 199 µm, or 200 µm, or 210 µm, or 250 µm, or 275 µm, or 300 µm.

The powder has a sphericity from 0.92 to 1.0. In an embodiment, the powder has a sphericity from 0.92, or 0.95, or 0.98 to 0.99, or 1.0. A sphericity of 1.0 indicates a powder particle's surface area is the same as the surface area of a sphere with the same volume as the given particle. In other words, a sphericity of 1.0 indicates a powder particle is spherical in shape with no surface voids.

The powder has a particle size distribution from 1 to less than 2. In an embodiment, the powder has a particle size distribution from 1.0, or 1.1, or 1.2 to 1.3, or 1.4, or 1.5, or 1.6, or 1.7, or 1.8, or 1.9, or less than 2.0. A particle size distribution from 1 to less than 2 indicates the powder includes particles of the same size, or substantially the same size.

The powder has a particle density from 98% to 100%. In an embodiment, the powder has a particle density of 100%. A particle density of 100% indicates a powder includes particles with no voids. The powder is a low porosity powder. A "low porosity" powder is a powder containing single particles with a particle density from 98% to 100%. A low porosity powder excludes powders containing agglomerates, which have a particle density of less than 80%.

In an embodiment, the powder has a D10 particle size from 1.0 µm, or 3.0 µm, or 3.5 µm to 5.0 µm, or 15 µm, or 20 µm, or 25 µm, or 30 µm, or 40 µm, or 45 µm, or 50 µm. In an embodiment, the powder has a D90 particle size from 1 µm, or 5 µm, or 10 µm, or 15 µm, or 20 µm to 50 µm, or 60 µm, or 70 µm, or 80 µm, or 90 µm, or 100 µm, or 110 µm, or 120 µm, or 130 µm, or 140 µm, or 150 µm, or 200 µm, or 250 µm, or 270 µm, or 300 µm, or 350 µm, or 400 µm, or 440 µm, or 450 µm, or 460 µm.

In an embodiment, the powder has a flow rate in a large funnel from 1.0 sec, or 1.5 sec to 2.3 sec, or 3.6 sec. In another embodiment, the powder has a flow rate in a small funnel from 15 sec, or 16 sec to 30 sec, or 50 sec, or 60 sec, or 150 sec, or 160 sec.

In an embodiment, the powder has the following properties: (i) a mean volume average particle size from 10 µm, or 11 µm to 110 µm, or 150 µm, or 199 µm, or 200 µm, or 210 µm, or 250 µm, or 275 µm, or 300 µm; (ii) a sphericity from 0.92, or 0.95, or 0.98 to 0.99, or 1.0; (iii) a particle size distribution from 1.0, or 1.1, or 1.2 to 1.3, or 1.4, or 1.5, or 1.6, or 1.7, or 1.8, or 1.9, or less than 2.0; and (iv) a particle density from 98% to 100%; and the powder optionally has one, some or all of the following properties: (vi) a D10 particle size from 1.0 µm, or 3.0 µm, or 3.5 µm to 5.0 µm, or 15 µm, or 20 µm, or 25 µm, or 30 µm, or 40 µm, or 45 µm, or 50 µm; and/or (vii) a D90 particle size from 1 µm, or 5 µm, or 10 µm, or 15 µm, or 20 µm to 50 µm, or 60 µm, or 70 µm, or 80 µm, or 90 µm, or 100 µm, or 110 µm, or 120 µm, or 130 µm, or 140 µm, or 150 µm, or 200 µm, or 250 µm, or 270 µm, or 300 µm, or 350 µm, or 400 µm, or 440 µm, or 450 µm, or 460 µm; and/or (viii) a flow rate in a large funnel from 1.0 sec, or 1.5 sec to 2.3 sec, or 3.6 sec; and/or (ix) a flow rate in a small funnel from 15 sec, or 16 sec to 30 sec, or 50 sec, or 60 sec, or 150 sec, or 160 sec.

In an embodiment, the powder is void of, or substantially void of, agglomerates.

The removing the water step may comprise two or more embodiments discussed herein.

In an embodiment, the process includes:

(i) melt blending, in an extruder, (a) a polyolefin phase, (b) an aqueous phase, (d) an optional polyolefin wax, and (e) an optional additive in the presence of (c) at least one dispersant selected from an acrylic dispersant, a poloxamer dispersant, and combinations thereof;

(ii) producing an interfacial tension from 0.1 dynes/cm, or 5.0 dynes/cm, or 6.0 dynes/cm, or 6.5 dynes/cm to 7.0 dynes/cm, or 10.0 dynes/cm, or 19.0 dynes/cm, or 20.0 dynes/cm, or 25 dynes/cm;

(iii) forming a polyolefin aqueous dispersion having from 25 wt % to 90 wt % solids content of dispersion; and (iv) removing the water from the polyolefin aqueous dispersion to form a powder, the powder having: (1) a mean volume average particle size from 10 µm, or 11 µm to 110

µm, or 150 µm, or 199 µm, or 200 µm, or 210 µm, or 250 µm, or 275 µm, or 300 µm; (2) a sphericity from 0.92, or 0.95, or 0.98 to 0.99, or 1.0; (3) a particle size distribution from 1.0, or 1.1, or 1.2 to 1.3, or 1.4, or 1.5, or 1.6, or 1.7, or 1.8, or 1.9, or less than 2.0; and (4) a particle density from 98% to 100%.

In an embodiment, steps (i)-(iii) are performed simultaneously. Step (iv) is performed after steps (i)-(iii).

The process may comprise two or more embodiments discussed herein.

The present disclosure also provides a powder produced by the present process.

Powder

The present disclosure relates to a powder. The powder includes (a) a polyolefin having a melting temperature from greater than 115° C. to 170° C., a density from 0.800 g/cc to 1.00 g/cc, and a melt index from 1.0 g/10 min to 1,000 g/10 min; and (b) from 1 wt % to 15 wt % of a dispersant selected from an acrylic dispersant, a poloxamer, and combinations thereof; (c) optionally, a polyolefin wax; and (d) optionally, an additive. The powder has (i) a mean volume average particle size from 10 µm to 300 µm; (ii) a sphericity from 0.92 to 1.0; (iii) a particle size distribution from 1.0 to less than 2.0; and (iv) a particle density from 98% to 100%.

The polyolefin may be any (a) polyolefin phase disclosed herein. The dispersant may be any (c) dispersant disclosed herein. The optional polyolefin wax may be any (d) optional polyolefin wax disclosed herein. The optional additive may be any (e) optional additive disclosed herein. The powder may be any powder disclosed herein.

In an embodiment, the powder contains, consists essentially of, or consists of: (a) from 60 wt %, or 70 wt % to 80 wt %, or 90 wt % of the polyolefin that is an ethylene-based polymer having a melting temperature from greater than 115° C. to 140° C.; (b) from 5 wt %, or 7 wt % to 8 wt %, or 20 wt % of the acrylic dispersant; and (c) from 5 wt %, or 10 wt % to 15 wt %, or 20 wt % of the polyolefin wax; and the powder has: (i) a mean volume average particle size from 10 µm, or 12 µm to 110 µm, or 300 µm; (ii) a sphericity from 0.92 to 1.0; (iii) a particle size distribution from 1.0, or 1.4 to 1.6, or less than 2.0; (iv) a particle density from 98% to 100%; (v) optionally, a D10 particle size from 1 µm, or 4 µm to 35 µm, or 40 µm; (vi) optionally, a D90 particle size from 20 µm, or 22 µm to 196 µm, or 200 µm; (vii) optionally, a flow rate in a large funnel from 1 sec, or 2 sec to 3 sec, or 5 sec; and (viii) optionally, a flow rate in a small funnel from 40 sec, or 45 sec to 50 sec, or 55 sec.

In an embodiment, the powder contains, consists essentially of, or consists of: (a) from 40 wt %, or 70 wt %, or 75 wt % to 80 wt %, or 85 wt %, or 90 wt % of the polyolefin that is an ethylene-based polymer having a melting temperature from greater than 115° C. to 140° C.; (b) from 1 wt %, or 5 wt % to 10 wt %, or 15 wt % of the poloxamer; and (c) from 5 wt %, or 7 wt %, or 9 wt % to 10 wt %, or 15 wt %, or 20 wt % of the polyolefin wax; and the powder has: (i) a mean volume average particle size from 10 µm, or 15 µm to 70 µm, or 200 µm, or 250 µm; (ii) a sphericity from 0.92 to 1.0; (iii) a particle size distribution from 1.0, or 1.1, or 1.2 to 1.9, or less than 2.0; (iv) a particle density from 98% to 100%; (v) optionally, a D10 particle size from 1 µm, or 3 µm to 40 µm, or 45 µm; (vi) optionally, a D90 particle size from 5 µm, or 15 µm to 300 µm, or 450 µm; (vii) optionally, a flow rate in a large funnel from 1.0 sec, or 1.5 sec to 2 sec, or 5 sec; and (viii) optionally, a flow rate in a small funnel from 15 sec, or 16 sec to 26 sec, or 30 sec.

In an embodiment, the powder contains, consists essentially of, or consists of: (a) from 60 wt %, or 70 wt % to 75 wt %, or 80 wt %, or 90 wt % of the polyolefin that is a propylene-based polymer having a melting temperature from 130° C., or 140° C. to 150° C., or 170° C.; (b) from 5 wt %, or 10 wt % to 15 wt %, or 20 wt % of the acrylic dispersant; and (c) from 5 wt %, or 10 wt % to 15 wt %, or 20 wt % of the polyolefin wax; and the powder has: (i) a mean volume average particle size from 10 µm, or 11 µm to 31 µm, or 35 µm, or 40 µm; (ii) a sphericity from 0.92 to 1.0; (iii) a particle size distribution from 1.0, or 1.3, to 1.9, or less than 2.0; (iv) a particle density from 98% to 100%; (v) optionally, a D10 particle size from 1 µm, or 3 µm to 5 µm, or 10 µm; and (vi) optionally, a D90 particle size from 15 µm, or 18 µm to 64 µm, or 70 µm.

In an embodiment, the powder contains, consists essentially of, or consists of: from 60 wt %, or 70 wt % to 80 wt %, or 90 wt % of the polyolefin; (b) from 0.1 wt %, or 5 wt %, or 7 wt % to 8 wt %, or 20 wt % of the acrylic dispersant; and (c) optionally, from 5 wt %, or 10 wt % to 15 wt %, or 20 wt % of the polyolefin wax.

In an embodiment, the powder contains, consists essentially of, or consists of: from 40 wt %, or 70 wt %, or 75 wt % to 80 wt %, or 85 wt %, or 90 wt % of the polyolefin; (b) from 0.1 wt %, or 1 wt %, or 5 wt % to 10 wt %, or 15 wt % of the poloxamer; and (c) optionally, from 5 wt %, or 7 wt %, or 9 wt % to 10 wt %, or 15 wt %, or 20 wt % of the polyolefin wax.

It is understood that the sum of the components in each of the powders disclosed herein, including the foregoing powders, yields 100 wt %.

In an embodiment, the polyolefin contains a blend of two or more polyolefins, such as a blend of HDPE and LDPE.

In an embodiment, the powder is void of, or substantially void of, agglomerates.

The present powder is useful in 3D-printing such as in a powder bed fusion technique. The present powder is also useful in application such as rotomolding and powder coatings.

The powder may comprise two or more embodiments discussed herein.

By way of example, and not limitation, some embodiments of the present disclosure will now be described in detail in the following Examples.

Examples

Materials used in the examples are provided in Table 1 below.

TABLE 1

| Material/Description | Properties | Source |
| --- | --- | --- |
| DOW ™ DMDA-8007 NT 7 (DMDA-8007) | HDPE; density = 0.965 g/cc; melting point = 133° C.; melt index (190° C./2.16 kg) = 8.3 g/10 min | The Dow Chemical Company |
| DOW ™ DMDA-8907 NT 7 (DMDA-8907) | HDPE; density = 0.952 g/cc; melting point = 131° C.; melt index (190° C./2.16 kg) = 6.8 g/10 min | The Dow Chemical Company |
| DOW ™ DMDA-8904 NT 7 (DMDA-8904) | HDPE; density = 0.952 g/cc; melting point = 131° C.; melt index (190° C./2.16 kg) = 4.4 g/10 min | The Dow Chemical Company |

TABLE 1-continued

| Material/Description | Properties | Source |
|---|---|---|
| AFFINITY ™ PL 1280G (PL 1280G) | LDPE; density = 0.900 g/cc; melting point = 96° C.; melt index (190° C./2.16 kg) = 6.0 g/10 min | The Dow Chemical Company |
| INFUSE ™ 9500 | ethylene/1-octene multi-block copolymer; density = 0.877 g/cc; melting point = 122° C.; melt index (190° C./2.16 kg) = 5.0 g/10 min | The Dow Chemical Company |
| DOW ™ 6D43 | polypropylene homopolymer density = 0.900 g/cc; melting point = 148° C.; melt flow rate (230° C./2.16 kg) = 35.0 g/10 min | The Dow Chemical Company |
| Pluronic ™ F-108 | poloxamer dispersant; ethylene oxide/propylene oxide block copolymer; 80 wt % ethylene oxide*; 20 wt % propylene oxide*; melting point = 57° C.; interfacial tension = 12.52 dynes/cm; solid | BASF Corporation |
| AD-A | acrylic dispersant, ethylhexyl acrylate/methylmethacrylate/methacrylic acid terpolymer; 74 wt % 2-EHA*, 2 wt % MMA*; 24 wt % MAA*; Tg = −20° C.; acid value = 153 mg KOH/g; viscosity = 80 mPa · s; pH = 4.4; interfacial tension = 18.98 dynes/cm; liquid | Produced as described below |
| AD-B | acrylic dispersant, ethylhexyl acrylate/methylmethacrylate/methacrylic acid terpolymer; 10 wt % 2-EHA*; 66 wt % MMA*; 24 wt % MAA*; Tg = 90° C.; acid value = 153 mg KOH/g; viscosity = 80 mPa · s; pH = 4.5; interfacial tension = 6.91 dynes/cm; liquid | Produced as described below |
| ECOSURF ™ EH-40 | nonionic dispersant, alcohol ethoxylate; viscosity = 472 mPa · s; pH = 6.5; liquid | The Dow Chemical Company |
| TERGITOL ™ 15-S-40 | nonionic dispersant, secondary alcohol ethoxylate; liquid | The Dow Chemical Company |
| Licocene ™ PE MA 4351 (Licocene 4351) | maleic anhydride grafted polyethylene wax; density = 0.99 g/cc; drop point = 123° C.; acid value = 45 mg KOH/g; melt viscosity at 140° C. = 200-500 mPa · s | Clariant |
| Licocene ™ PP MA 6452 (Licocene 6452) | maleic anhydride grafted polypropylene wax; density = 0.93 g/cc; drop point = 144° C.; acid value = 41 mg KOH/g; melt viscosity at 170° C. = 800-1400 mPa · s | Clariant |

*Based on total weight of the dispersant

Preparation of Acrylic Dispersant a (AD-A)

Acrylic Dispersant A (AD-A) is prepared by adding 3210 grams (g) of DI water to a 4 liter (L) 4-neck glass flask equipped with overhead stirring, a condenser, and a heating mantle connected to a temperature controller that is set to modulate a pot-lifter. The flask is placed under nitrogen and heated to 80° C. Concurrently, a monomer emulsion is constructed by mixing 3107 g DI water, 70.1 g Aerosol™ A-102 Surfactant (disodium ethoxylated alcohol ($C_{10-12}$) half ester of sulfosuccinic acid, available from CYTEC Industries Inc.), 165.1 g FES-32 Surfactant (sodium lauryl ether sulfate, available from BASF Corporation), 6777.1 g 2-ethylhexyl acrylate, 183.2 g methyl methacrylate, and 2198.0 g MAA to form a thick white stable emulsion. Once the reactor temperature is stabilized at 80° C., 220 g of PRIMAL™ E-1476 acrylic preform (110 nm and 45 wt % solids, available from The Dow Chemical Company) is added to the reactor, followed by a solution of 216.8 g DI water and 6.9 g ammonium persulfate. An initiator co-feed solution is made using 462.9 g DI water and 11.4 g ammonium persulfate. The monomer emulsion is fed into the reactor at a rate of 37 g/min and the initiator co-feed solution is fed into the reactor at a rate of 1.4 g/min. After 20 minutes, the monomer emulsion feed rate is increased to 74 g/min and the initiator co-feed solution feed rate is increased to 2.8 g/min. At the end of the monomer and initiator feeds, the lines are rinsed and the reaction is held at 80° C. for 30 minutes. Subsequently, the reaction mixture is cooled to 60° C. A solution of 0.06 g iron(II) sulfate heptahydrate in 41.7 g DI water is added to the reactor. A (i) solution of initiator, containing 279.8 g DI water, 4.2 g FES-32 Surfactant and 6.9 g Luperox™ TAH-85 (a polymer initiator, available from Arkema), and a (ii) solution of reductant containing 281.5 g DI water and 9.4 g sodium sulfoxylate formaldehyde are added to the reaction at the rate of 9.7 g/min. At the end of the feeds, the reaction mixture is cooled to room temperature and filtered through a 100 μm filter.

The resulting polymer is Acrylic Dispersant A (AD-A) containing 74 wt % 2-EHA, 2 wt % MMA; and 24 wt % MAA, based on the total weight of the dispersant. AD-A has low residual monomer, a final solids wt % of 50.1 wt %, a PDI of 3.3, and an interfacial tension of 18.98 dynes/cm (vs Lucant™ LX001 at 60° C.).

Preparation of Acrylic Dispersant B (AD-B)

Acrylic Dispersant B (AD-B) is prepared by adding 775 g of DI water, 5 g of Aerosol™ OT-75 Surfactant (sodium dioctyl sulfosuccinate, available from CYTEC Industries Inc.), 5 g of Aerosol™ A-102 Surfactant, and 5 g of sodium acetate to a 4 L 4-neck glass flask equipped with overhead stirring, a condenser, and a heating mantle connected to a temperature controller that is set to modulate a pot-lifter. The flask is put under nitrogen and heated to 92° C. Concurrently, a monomer emulsion is constructed by mixing 600 g DI water, 35.64 g FES-32 Surfactant, 197.5 g 2-ethylhexyl acrylate, 1312 g methyl methacrylate, 13.5 g n-dodecylmecaptan, and 465.5 g MAA to form a thick white stable emulsion. Once the reactor temperature is stabilized at 92° C., 126 g of the monomer emulsion is added to the reactor, followed by a solution of 70 g DI water and 1.5 g ammonium persulfate. The reaction is held for 20 minutes. An initiator co-feed solution is made using 60 g DI water and 2.5 g ammonium persulfate. The monomer emulsion is fed into the reactor at a rate of 7.2 g/min and the initiator co-feed solution is fed into the reactor at a rate of 0.3 g/min. After 20 minutes, the monomer emulsion feed rate is increased to 15.4 g/min and the initiator co-feed solution feed rate is increased to 0.6 g/min. At the end of the monomer and initiator feeds, the lines are rinsed and the reaction is held at 92° C. for 30 minutes. Subsequently, the reaction mixture is cooled to 60° C. A solution of 0.014 g iron(II) sulfate heptahydrate in 18.3 g DI water is added to the reactor. A (i)

solution of initiator containing 32 g DI water, 0.9 g FES-32, and 1.5 g Luperox™ TAH-85, and a (ii) solution of reductant containing 32 g DI water and 4.1 g sodium sulfoxylate formaldehyde are added to the reaction at a rate of 3.8 g/min. At the end of the feeds, the reaction mixture is cooled to room temperature and filtered through a 100 μm screen.

The resulting polymer is Acrylic Dispersant B (AD-B) containing contains 10 wt % 2-EHA, 66 wt % MMA, and 24 wt % MAA, based on the total weight of the dispersant. AD-B has low residual monomer, a final solids wt % of 54 wt %, a PDI of 3.2, a glass transition temperature (Tg) of 90° C., and an interfacial tension of 6.91 dynes/cm (vs Lucant™ LX001 at 60° C.).

Preparation of Aqueous Dispersions

Aqueous dispersions are prepared using the BLUE-WAVE™ extruder process of The Dow Chemical Company using the extruder of FIG. 1. The dispersions are prepared using a 25 mm Berstorff™ (X-line) twin-screw extruder. The polyolefin is added to the extruder as a pellet through a large Schenk™ feeder that drops into a feed throat. The polyolefin wax and Pluronic™ F-108 are added to the extruder as a pellet or powder using a KQX K-Tron™ feeder that also drops into the feed throat. The temperature profile for the mix and convey zone, including Zones 1-3 of the extruder is as follows: Zone 1=25° C.; Zone 2=90° C.; Zone 3 temperature is provided in Table 2. The acrylic dispersant (AD-A and AD-B) is added to the extruder as a liquid via a 1000D ISCO™ syringe pump. The acrylic dispersant enters the extruder through an injector (without a pin) that is located in Zone 5A. The initial water is added to the extruder via a 500D ISCO™ pump through an injector (with a pin) that is located in Zone 4B. The base (DMEA) is utilized to provide 140% neutralization when a polyolefin wax or an acrylic dispersant are used. The base is added to the extruder via a 500D ISCO™ pump that is piped in with the initial water. The base enters the extruder through Zone 4B. Finally, 7 dilution water is delivered via a large Hydracell™ pump through an injector that is placed in Zone 8A.

The extrusion conditions are provided in Table 2.

TABLE 2

| | Polyolefin 1 Feed Rate (g/min) | Polyolefin 2 Feed Rate (g/min) | Dispersant Feed Rate (g/min) | Polyolefin Wax Feed Rate (g/min) | Base Feed Rate (mL/min) | Extruder Temp. in Zone 3 (° C.) | Extruder Speed (rpm) | Extruder Pressure in Zone 12 (psi) | Solids Content of Dispersion After Dilution (wt %) |
|---|---|---|---|---|---|---|---|---|---|
| Ex 1 | DMDA-8007 58.64 | — | AD-A 15.13 | Licocene 4351 11.35 | DMEA 2.8 | 160 | 450 | 235 | 40 |
| Ex 2 | DOW™ 6D43 85.1 | — | AD-B 31.5 | Licocene 6452 11.40 | DMEA 7.37 | 160 | 450 | 260 | 40 |
| Ex 3 | DMDA-8007 68.86 | — | Pluronic™ F-108 6.81 | — | — | 180 | 450 | 224 | 50 |
| Ex 4 | DMDA-8907 56.75 | — | Pluronic™ F-108 11.35 | Licocene 4351 7.57 | DMEA 0.5 | 170 | 450 | 240 | 40 |
| Ex 5 | PL 1280G 68.86 | — | Pluronic™ F-108 6.81 | — | — | 160 | 450 | 220 | 50 |
| Ex 6 | PL 1280G 60.54 | — | Pluronic™ F-108 7.57 | Licocene 4351 7.57 | DMEA 0.7 | 160 | 450 | 190 | 50 |
| Ex 7 | PL 1280G 34.43 | DMDA-8904 34.43 | Pluronic™ F-108 6.80 | — | — | 160 | 450 | 237 | 40 |
| Ex 8 | PL 1280G 30.27 | DMDA-8904 30.27 | Pluronic™ F-108 7.57 | Licocene 4351 7.57 | DMEA 0.7 | 160 | 450 | 215 | 40 |
| Ex 9 | INFUSE™ 9500 55.72 | — | Pluronic™ F-108 6.20 | Licocene 4351 6.88 | DMEA 0.4 | 480 | 450 | 250 | 40 |
| CS 10* | INFUSE™ 9500 68.86 | — | Pluronic™ F-108 9.08 | — | — | 180 | 450 | 240 | 50 |
| CS 11* | INFUSE™ 9500 68.86 | — | ECOSURF™ EH-40 9.08 | — | — | 180 | 450 | 240 | 50 |
| CS 12* | INFUSE™ 9500 68.86 | — | TERGITOL™ 15-S-40 9.08 | — | — | 180 | 450 | 240 | 50 |

*For CS 10, CS 11, and CS 12, the material exiting the extruder is composed of strings and caked material that cannot be diluted in water, measured, or broken back down into powder. This is true across a range of water concentrations during emulsion (10-50%). Consequently, CS 10, CS 11, and CS 12 each is an unstable aqueous dispersion and is not considered to enable the formation of a powder with stable particles.

Filtering to Form a Powder

The polyolefin aqueous dispersions are diluted to 10 wt % solids, particles are allowed to float to the top of the polyolefin aqueous dispersion for 2 hours, and the particles are then skimmed and filtered using vacuum filtration. The filtered particles are then rinsed with water to form a powder. Powder is allowed to dry through vacuum or air drying at room temperature (23° C.). Flow aid is added (1 wt % AEROSIL™ R-972 fumed silica, available from Evonik Industries) by adding powder and flow aid to a speed mixer cup and mixing at 3500 rotations per minute (rpm) for 15 seconds in a FlackTek™ dual axis mixer.

The composition and properties of each powder is provided in Table 3. Ex 1-Ex 9 each produced a powder with a particle density of 100%. Yield is calculated as a percentage of the weight of powder collected versus the weight of solids in the polyolefin aqueous dispersion. Flow of the powder is measured as a function of the time it takes for 50 g powder to flow through a large funnel and a small funnel. The results are provided in Table 3. In Table 3, "NM" refers to a property that is not measured.

The powders of Ex 1-Ex 9 each advantageously exhibit a mean volume average particle size from 10 μm to 300 μm, a sphericity from 0.92 to 1.0, a particle size distribution from 1 to less than 2, and a particle density from 98% to 100%, indicating the powders of Ex 1-Ex 9 are suitable for 3D-printing techniques such as powder bed fusion.

TABLE 3

| Sample | Powder Composition# | wt % water during emulsification* | Mean Volume Average Particle Size (μm) | D10 (μm) | D90 (μm) | Particle Size Distribution | Yield (% conversion to powder) | Flow in Large Funnel (sec) | Flow in Small Funnel (sec) | Sphericity |
|---|---|---|---|---|---|---|---|---|---|---|
| Ex 1 | 77.5 wt % DMDA-8007 (HDPE) 7.5 wt % AD-A 15 wt % Licocene ™ PE MA 4351 | 25<br>29<br>33 | 105.9<br>62.0<br>12.6 | 33.8<br>17.1<br>4.9 | 195.2<br>117.6<br>22.7 | 1.5<br>1.6<br>1.4 | 98<br>NM<br>NM | 2.3<br>NM<br>NM | 45.2<br>NM<br>NM | 0.93<br>NM<br>NM |
| Ex 2 | 75 wt % DOW ™ 6D43 (Polypropylene) 15 wt % AD-B 10 wt % Licocene ™ PP MA 6452 | 25<br>28 | 30.8<br>11.2 | 4.1<br>3.7 | 63.2<br>18.6 | 1.9<br>1.3 | NM<br>NM | NM<br>NM | NM<br>NM | NM<br>NM |
| Ex 3 | 91 wt % DMDA-8007 (HDPE) 9 wt % Pluronic ™ F-108 | 25<br>45 | 36.6<br>36.0 | 12.2<br>11.8 | 67.5<br>67.3 | 1.5<br>1.5 | NM<br>98 | NM<br>3.6 | NM<br>147.3 | NM<br>0.98 |
| Ex 4 | 75 wt % DMDA-8907 (HDPE) 15 wt % Pluronic ™ F-108 10 wt % Licocene ™ PE MA 4351 | 16.5<br>18 | 8.8<br>18.5 | 3.1<br>7.1 | 15.0<br>30.9 | 1.4<br>1.2 | NM<br>NM | NM<br>NM | NM<br>NM | NM<br>NM |
| Ex 5 | 91 wt % AFFINITY ™ PL 1280G (LDPE) 9 wt % Pluronic ™ F-108 | 25<br>30 | 14.1<br>22.5 | 5.2<br>7.4 | 24.3<br>39.9 | 1.4<br>1.4 | NM<br>NM | NM<br>NM | NM<br>NM | NM<br>NM |
| Ex 6 | 88 wt % AFFINITY ™ PL 1280G (LDPE) 5 wt % Pluronic ™ F-108 7 wt % Licocene ™ PE MA 4351 | 15<br>22 | 35.1<br>199.0 | 9.1<br>40.6 | 67.5<br>440.8 | 1.7<br>1.9 | NM<br>NM | NM<br>NM | NM<br>NM | NM<br>NM |
| Ex 7 | 45.5 wt % AFFINITY ™ PL 1280G (LDPE) 45.5 wt % DMDA-8904 (HDPE) 9 wt % Pluronic ™ F-108 | 40 | 41.8 | 13.0 | 78.3 | 1.6 | NM | NM | NM | NM |
| Ex 8 | 40 wt % AFFINITY ™ PL 1280G (LDPE) 40 wt % DMDA-8904 (HDPE) 10 wt % Pluronic ™ F-108 10 wt % Licocene ™ PE MA 4351 | 15 | 68.1 | 17.2 | 135.2 | 1.7 | 96 | 1.8 | 25.6 | 0.96 |
| Ex 9 | 85 wt % INFUSE ™ 9500 (multi-block) 5 wt % Pluronic ™ F-108 10 wt % Licocene ™ PE MA 4351 | 10<br>22<br>25 | 3.2<br>51.4<br>138.4 | 1.5<br>12.8<br>32.6 | 5.1<br>112.2<br>268.0 | 1.1<br>1.9<br>1.7 | NM<br>95<br>NM | NM<br>1.5<br>NM | NM<br>16.1<br>NM | NM<br>0.97<br>NM | wt % based on the total weight of the powder. Each sample has a total wt % of 100 wt %.
*wt % water in the emulsification zone prior to dilution, based on the total weight of the polyolefin aqueous dispersion.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A powder comprising:
   (a) a polyolefin having a melting temperature from greater than 115° C. to 170° C., a density from 0.800 g/cc to 1.00 g/cc, and a melt index from 1.0 g/10 min to 1,000 g/10 min; and
   (b) from 1 wt % to 15 wt % of a dispersant selected from the group consisting of an acrylic dispersant, a poloxamer, and combinations thereof,
   (c) optionally, a polyolefin wax;
   the powder having
   (i) a mean volume average particle size from 10 μm to 300 μm;
   (ii) a sphericity from 0.92 to 1.0;
   (iii) a particle size distribution from 1 to less than 2; and
   (iv) a particle density from 98% to 100%.

2. The powder of claim 1 wherein the polyolefin wax is a maleic anhydride grafted polyolefin wax.

3. The powder of claim 1 wherein the dispersant is the acrylic dispersant that is an ethylhexyl acrylate/methylmethacrylate/methacrylic acid terpolymer.

4. The powder of claim 1 wherein the powder comprises:
   (a) from 60 wt % to 90 wt % of the polyolefin comprising an ethylene-based polymer having a melting temperature from greater than 115° C. to 140° C. and a density from 0.870 g/cc to 0.970 g/cc;

(b) from 5 wt % to 20 wt % of the acrylic dispersant; and
(c) from 5 wt % to 20 wt % of the polyolefin wax.

5. The powder of claim 1 wherein the powder comprises:
    (a) from 70 wt % to 95 wt % of the polyolefin comprising an ethylene-based polymer having a melting temperature from greater than 115° C. to 140° C.;
    (b) from 1 wt % to 15 wt % of the poloxamer; and
    (c) from 5 wt % to 20 wt % of the polyolefin wax.

6. The powder of claim 1 wherein the polyolefin is an ethylene/α-olefin multi-block copolymer.

7. The powder of claim 1 wherein the polyolefin comprises a high density polyethylene and a low density polyethylene.

8. The powder of claim 1 wherein the powder comprises:
    (a) from 60 wt % to 90 wt % of the polyolefin comprising a propylene-based polymer having a melting temperature from 130° C. to 170° C.;
    (b) from 5 wt % to 20 wt % of the acrylic dispersant; and
    (c) from 5 wt % to 50 wt % of the polyolefin wax.

9. A powder comprising:
    (a) a polyolefin having a melting temperature from greater than 115° C. to 170° C., a density from 0.800 g/cc to 1.00 g/cc, and a melt index from 1.0 g/10 min to 1,000 g/10 min; and
    (b) from 0.1 wt % to 15 wt % of a dispersant selected from the group consisting of an acrylic dispersant, a poloxamer, and combinations thereof,
    the powder having
    (i) a mean volume average particle size from 10 μm to 300 μm;
    (ii) a sphericity from 0.92 to 1.0;
    (iii) a particle size distribution from 1 to less than 2; and
    (iv) a particle density from 98% to 100%.

* * * * *